United States Patent
Sewell et al.

(10) Patent No.: US 10,030,360 B2
(45) Date of Patent: Jul. 24, 2018

(54) SPROCKET WITH OFFSET MUD RELIEF

(71) Applicant: The Charles Machine Works, Inc., Perry, OK (US)

(72) Inventors: Cody L. Sewell, Perry, OK (US); Brant Douglas Kukuk, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 29 days.

(21) Appl. No.: 15/262,509

(22) Filed: Sep. 12, 2016

(65) Prior Publication Data
US 2017/0074383 A1  Mar. 16, 2017

Related U.S. Application Data

(60) Provisional application No. 62/217,111, filed on Sep. 11, 2015.

(51) Int. Cl.
| | |
|---|---|
| *E02F 5/06* | (2006.01) |
| *E02F 5/14* | (2006.01) |
| *F16H 55/08* | (2006.01) |
| *F16H 55/30* | (2006.01) |

(52) U.S. Cl.
CPC .............. *E02F 5/14* (2013.01); *E02F 5/06* (2013.01); *F16H 55/08* (2013.01); *F16H 55/303* (2013.01)

(58) Field of Classification Search
CPC ...... F16H 55/12; F16H 55/0813; F16H 55/30; F16H 55/08; F16G 1/28; E02F 5/06; E02F 5/14
USPC ........................................ 474/160, 152, 206
See application file for complete search history.

(56) References Cited

U.S. PATENT DOCUMENTS

| | | | | |
|---|---|---|---|---|
| 3,701,692 A | * | 10/1972 | Wright, III ............... | B23K 7/00 148/196 |
| 4,487,088 A | * | 12/1984 | Olson ..................... | F16H 55/30 474/152 |
| 5,318,483 A | * | 6/1994 | Reid ...................... | F16H 55/303 474/152 |
| 5,974,673 A | * | 11/1999 | Sundstrom .............. | F16H 55/38 30/381 |
| 6,013,001 A | * | 1/2000 | Miyoshi .................. | B62M 9/10 474/156 |
| 6,071,204 A | * | 6/2000 | Jefferies ................. | F16H 55/30 474/161 |
| 6,415,532 B1 | | 7/2002 | Bricko et al. | |
| 6,428,436 B1 | * | 8/2002 | Woyach ................. | B65G 23/06 474/152 |

(Continued)

OTHER PUBLICATIONS

The Charles Machine Works, Inc. "Hard-Working Parts for Hard-Working Pros.", company catalog, 2016, thirty-nine pages, Perry, Oklahoma.

*Primary Examiner* — John Weiss
(74) *Attorney, Agent, or Firm* — Tomlinson McKinstry, P.C.

(57) ABSTRACT

A sprocket having one or more mud relief portions offset from the midpoint between adjacent teeth. The sprocket has a plurality of teeth, and saddle sections disposed on the periphery of the sprocket between each of the plurality of teeth. The saddle has a seat disposed at a midpoint between the adjacent teeth, and one or more mud relief portions disposed on each side of the seat. The mud relief portions are recessed within the sprocket. The mud relief portions may be mirror images of one another, or the saddle may alternatively be asymmetrically formed.

25 Claims, 12 Drawing Sheets

(56) References Cited

U.S. PATENT DOCUMENTS

2003/0083166 A1* 5/2003 Oertley .............. B62D 55/0963
  474/162
2010/0184547 A1* 7/2010 Clarke ................... F16H 7/023
  474/152
2011/0300977 A1* 12/2011 Hayami .................. F16H 55/30
  474/161

* cited by examiner

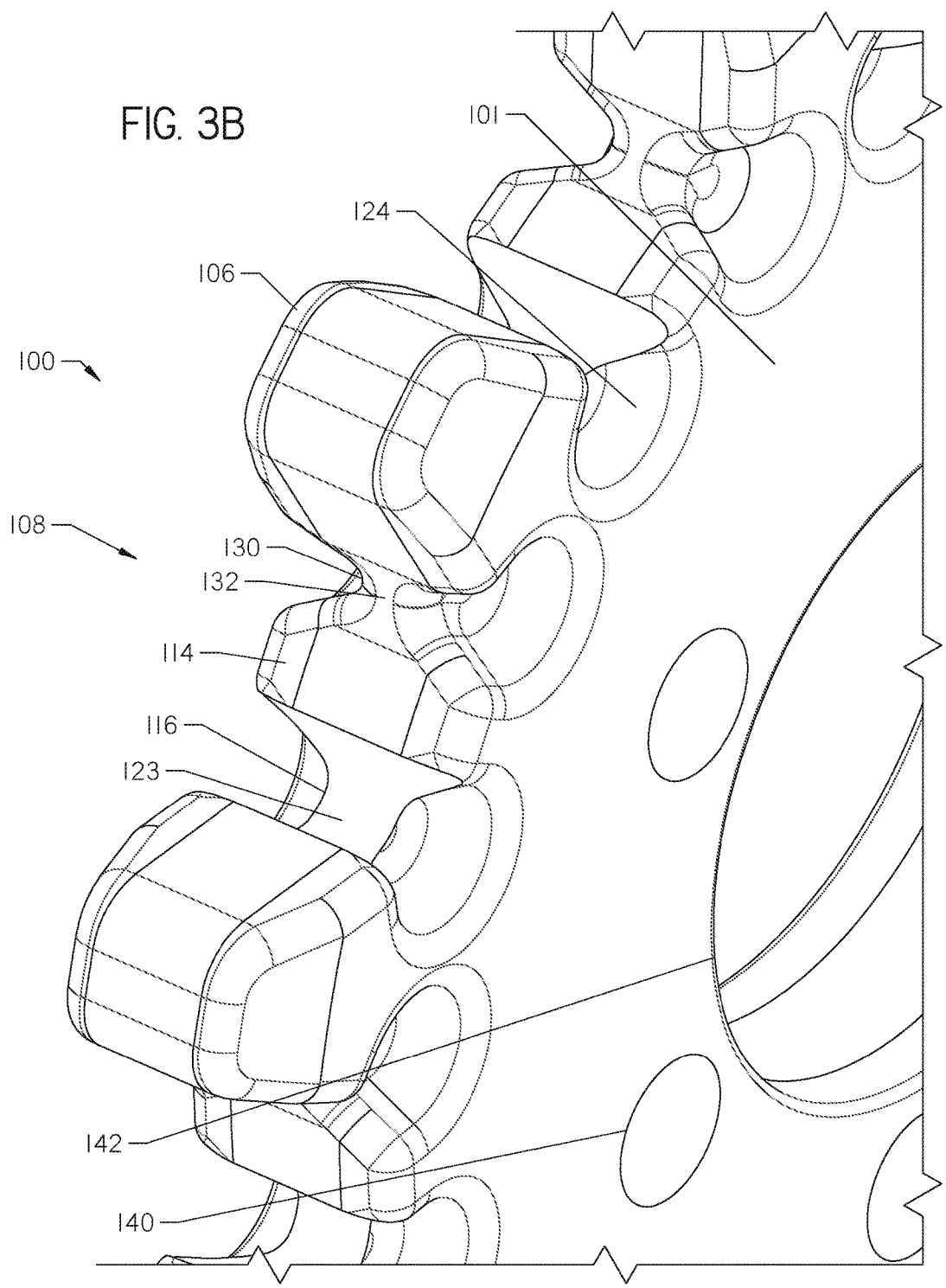

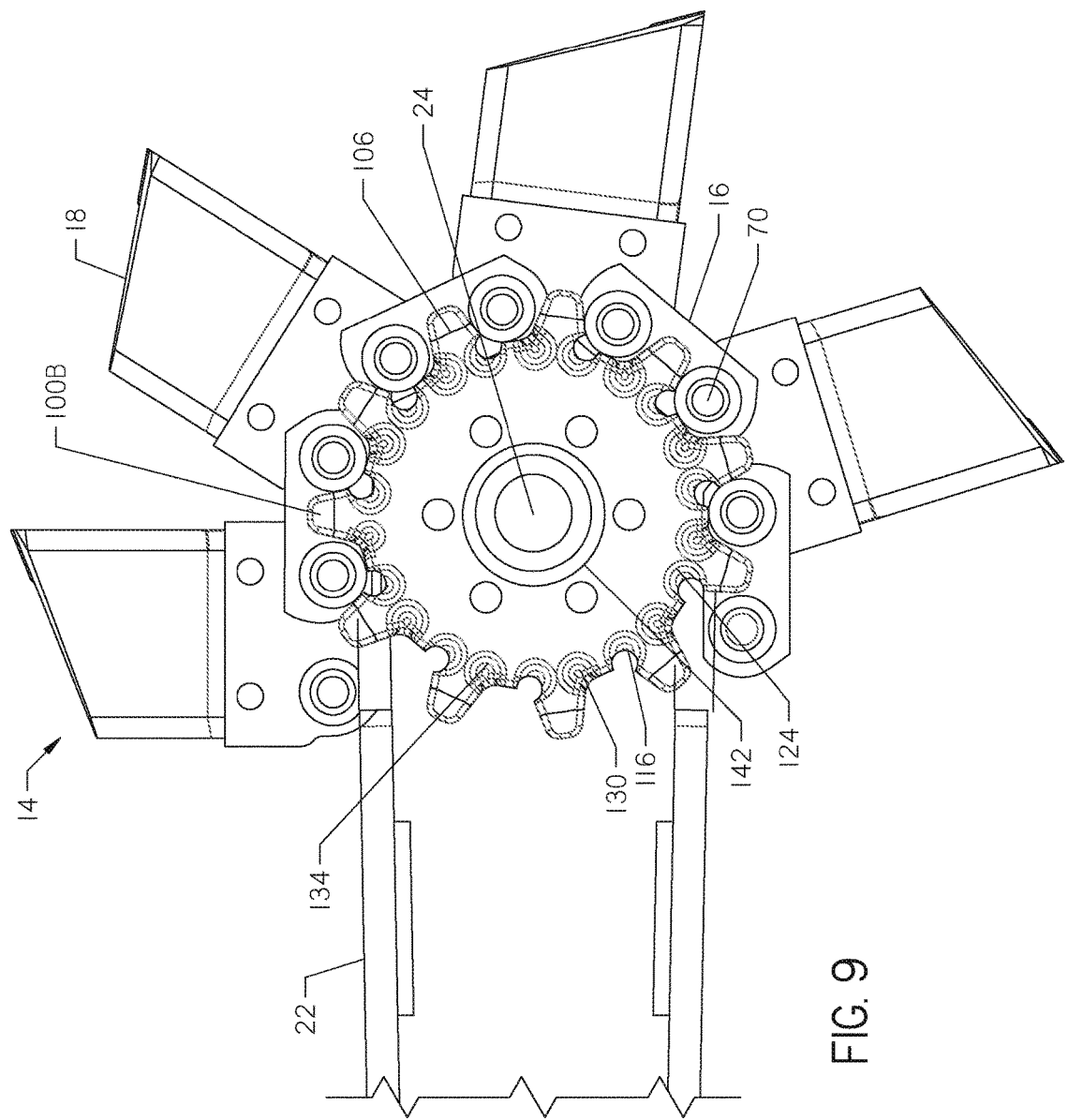

SPROCKET WITH OFFSET MUD RELIEF

CROSS REFERENCE TO RELATED APPLICATION

This application claims the benefit of U.S. Provisional Patent Application Ser. No. 62/217,111 tiled on Sep. 11, 2015, the entire contents of which are incorporated herein by reference.

FIELD

This invention relates generally to sprockets for trenching chains.

SUMMARY

A sprocket comprising a body having a center, a plurality of teeth, and a plurality of saddles. The plurality of teeth is disposed around the periphery of the body. Each tooth is situated on a radius extending from the body center. Each adjacent pair of radii defines a sector. The plurality of saddles are formed about the periphery of the body, with one and only one saddle situated between each adjacent pair of teeth. Each saddle is contained within a single sector and shaped asymmetrically with respect to a saddle plane that bisects the sector into equally sized parts.

A sprocket comprising a body, a plurality of radially-disposed teeth, a plurality of seats and a plurality of mud relief portions. Each adjacent pair of teeth defines a tooth plane disposed at a midpoint between the pair of teeth. One and only one seat is located on the tooth plane between each adjacent pair of the plurality of teeth. The mud relief portions are disposed between each of the plurality of seats and an adjacent tooth. Each mud relief portion is disposed entirely on a single side of its associated tooth plane.

BRIEF DESCRIPTION OF THE DRAWINGS

FIG. 3B is a cutaway perspective view of a saddle on the sprocket of FIG. 3A.

FIG. 9 is a cut-away partially sectional side view of the tail sprocket and chain of the trencher of FIG. 7.

DESCRIPTION OF THE PREFERRED EMBODIMENTS

Figure 7:
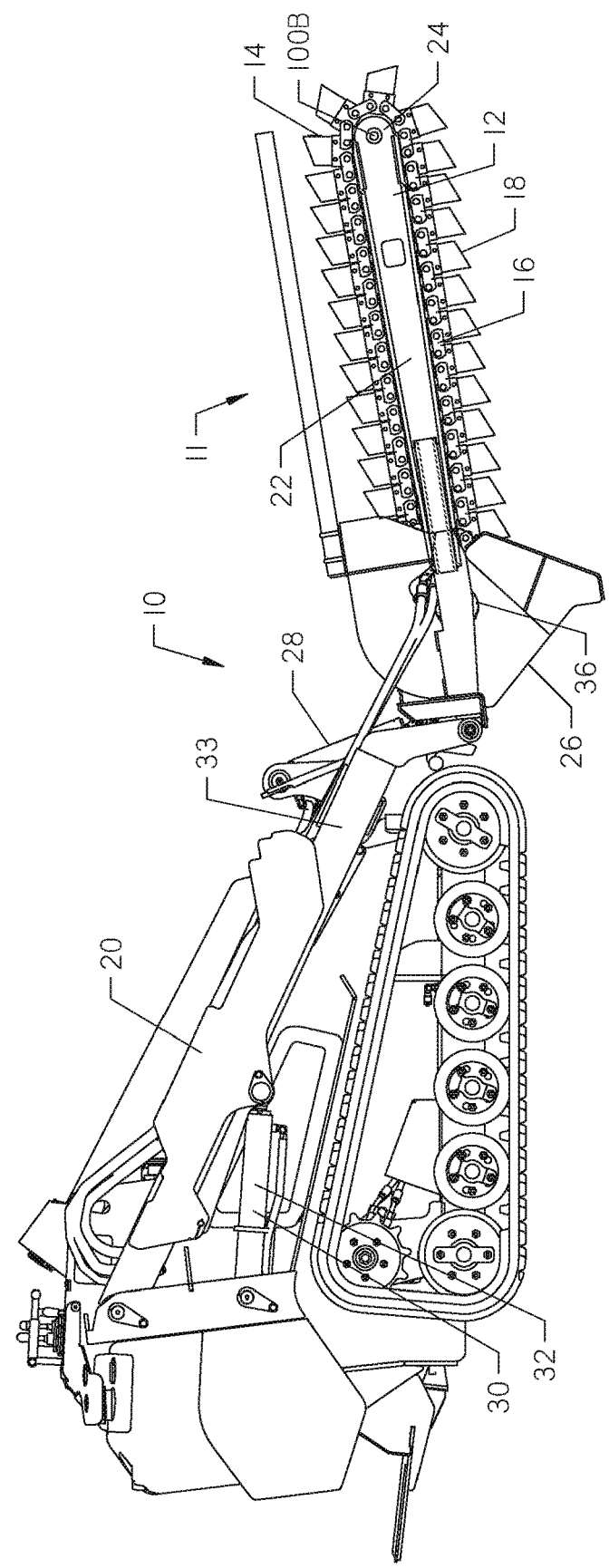
FIG. 7 is a side view of a trenching machine using the sprocket of the present invention.

This invention is a sprocket, such as those used with a trencher, such as the trencher 10 shown in FIG. 7. A motor turns a "head" sprocket such as the type of sprocket 100 that will be described in detail herein. The sprocket turns a digging chain 14 disposed around a boom 12. A "tail" sprocket is engaged with the chain 14 is at a distal end of the boom 12 to provide support for the chain. The digging chain 14 is rotated about the boom 12, uncovering a trench by removing soil and other material, The sprocket of the present invention has a mud relief feature disposed away from the midpoint of adjacent teeth of the sprocket. This orientation allows the sprocket to engage rollers on the digging chain of a trencher in such a way to avoid wear that could cause the mud relief feature to enlarge to the size of the roller. When the sprocket is worn such that the roller of a digging chain can engage the mud relief rather than the periphery of the sprocket, the orientation and operation of the digging chain is impaired, The figures and following description are for a sprocket design that overcomes these problems.

FIG. 1A-3B show a sprocket 100 for use with the present invention. The sprocket 100 comprises a body 101 and an exterior periphery 102 having a plurality of radially disposed sectors 104. The body 101 has a centerpoint 144. The sprocket 100 comprises a plurality of teeth 106 and a plurality of saddles 108. Each tooth 106 comprises a leading edge 109 and a trailing edge no relative to the direction of rotation r.

The sector 104 (FIG. 1C) is defined by the radius of the tooth 106 and an adjacent tooth 106, and the arc a that extends between the teeth. Preferably, the sprocket 100 is made up of sectors 104 having uniform internal angle θ. A tooth plane 112 is disposed at a midpoint of the sector 104 bisecting the same, equidistant from each adjacent tooth 106. The saddle 108 within each sector 104 is asymmetrically disposed about the tooth plane 112.

Accordingly, the saddle 108 is asymmetrical between adjacent teeth 106. The saddle 108 comprises a seat 114 formed substantially at the tooth plane 112. The seat 114 is substantially perpendicular to the tooth plane. A mud relief section 116 is formed between the seat 114 and an adjacent tooth 106. The mud relief section 116 is a curved void formed in the saddle 108.

The mud relief section 116 is located fully on a single side of the tooth plane 112. The mud relief section 116 has a cross-section which may be an arc or open curve with an internal angle of between 180 and 340 degrees. The scat 114, leading edge 109, and trailing edge 110 of adjacent teeth 106 are equidistant from a reference point 120 between the teeth 106 at a distance d. The mud relief portion 116 is located further than d away from the reference point 120.

The mud relief section 116 comprises a terminal wall 123 disposed in the sprocket. The terminal wall 123 has a thickness that is less than the thickness of the body 101 of the sprocket 100. A tapered portion 124 is disposed about the mud relief section 116. The tapered portion 124 has a thickness that is tapered between the thickness of the terminal watt 123 and the body 101.

The mud relief section 116 described herein is shaped as a cylindrical segment, or a void having the cross-sectional profile of an open curve. The void may be arcuate. However, other shapes may be utilized for the cross-section of the mud relief section 116, such as a triangular or rectangular shape.

The saddle 108 further comprises a mud relief section without a void with the cross-section of an open curve. This mud relief is characterized by a thinning of the body 101 between the seat 114 and an adjacent tooth 106 and referred to herein as a partial mud relief 130.

The partial mud relief 130 is disposed along a transitional curve 132 between the seat 114 and an adjacent tooth 106. The transitional curve 132 is preferably at or slightly more than the distance d from the reference point 120. The thickness of the saddle 108 at the transitional curve 132 is less than the thickness of the saddle at the seat 114. Preferably, the thickness of the transitional curve 132 is approximately one-third of the thickness of the seat 114. The partial mud relief 130 defines a tapered section 134. The tapered section 134 is disposed about the transitional curve 132 and has a thickness that is tapered between the transitional curve 132 and the body 101.

As shown, the partial mud relief 130 is located proximate the trailing edge 110 of a tooth 106 and the mud relief section 116 is disposed proximate the leading edge 109 of a tooth. The opposite configuration of the saddle 108, or alternating configurations are also possible. By utilizing one partial mud relief 130, the body 101 of the sprocket has more material proximate a base of the teeth 106 than if both mud reliefs comprised voids.

The body 101 may define a plurality of connection points 140 evenly radially disposed. Such connection points 140 facilitate connection to bolts (FIG. 8) which provide rotational force to the sprocket 100. Six connection points 140 are shown, though a different number may be used. The connection points 140 are only necessary if the sprocket 100 is a "head sprocket", that is, a sprocket driven by a rotational drive such that rotation of the sprocket causes the teeth to engage with a chain, such as a trencher chain, and drive the movement thereof.

The body 101 further may define a center void 142. The center void 142 may allow the sprocket 100 to rotate freely about a central axis located at the centerpoint 144 of the sprocket. The center void 142 may allow the sprocket to be freely rotating, as is the case with a "tail sprocket". A "tail sprocket" is described herein as a sprocket which is not driven rotationally by a motor, but freely rotates as its teeth 106 interact with a moving chain. Thus, a "tail sprocket" provides a chain with support and shape, but not motive force.

A "tail sprocket" may incorporate connection points 140 and a "head sprocket" may incorporate a center void 142 for uniformity of design.

Each of the plurality of teeth 106 may comprise a hardened beveled tip 150 for added durability. Additionally, the seat 11.4 may be provided with hard facing or otherwise hardened material to reduce erosion of the seat. As shown, there are eleven sectors 104 and, therefore, eleven teeth 106, but a different number may be utilized.

Figure 2:
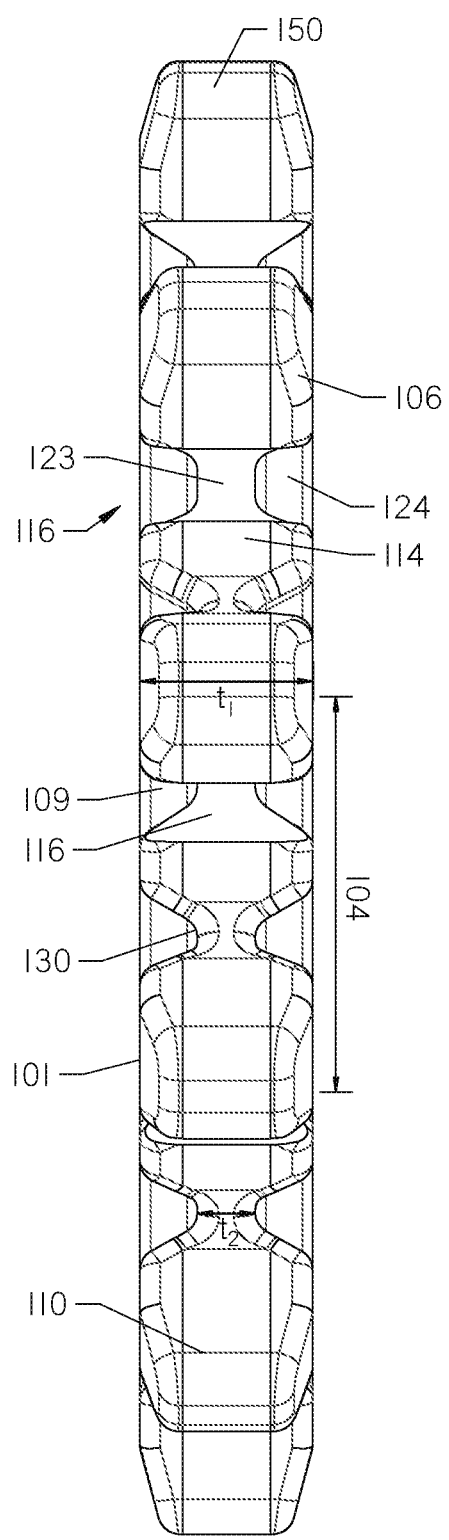
FIG. 2 is an edge view of the sprocket of FIG. 1A.

With reference now to FIG. 2, the sprocket 100 is shown on edge. The thickness of the body 101 and teeth 106 is given as $t_1$. The thickness of the transitional curve 132 is shown as $t_2$. The beveled tip 150 may be beveled radially, or may additionally be beveled relative to the thickness $t_1$ of the body 101.

Figure 3A:
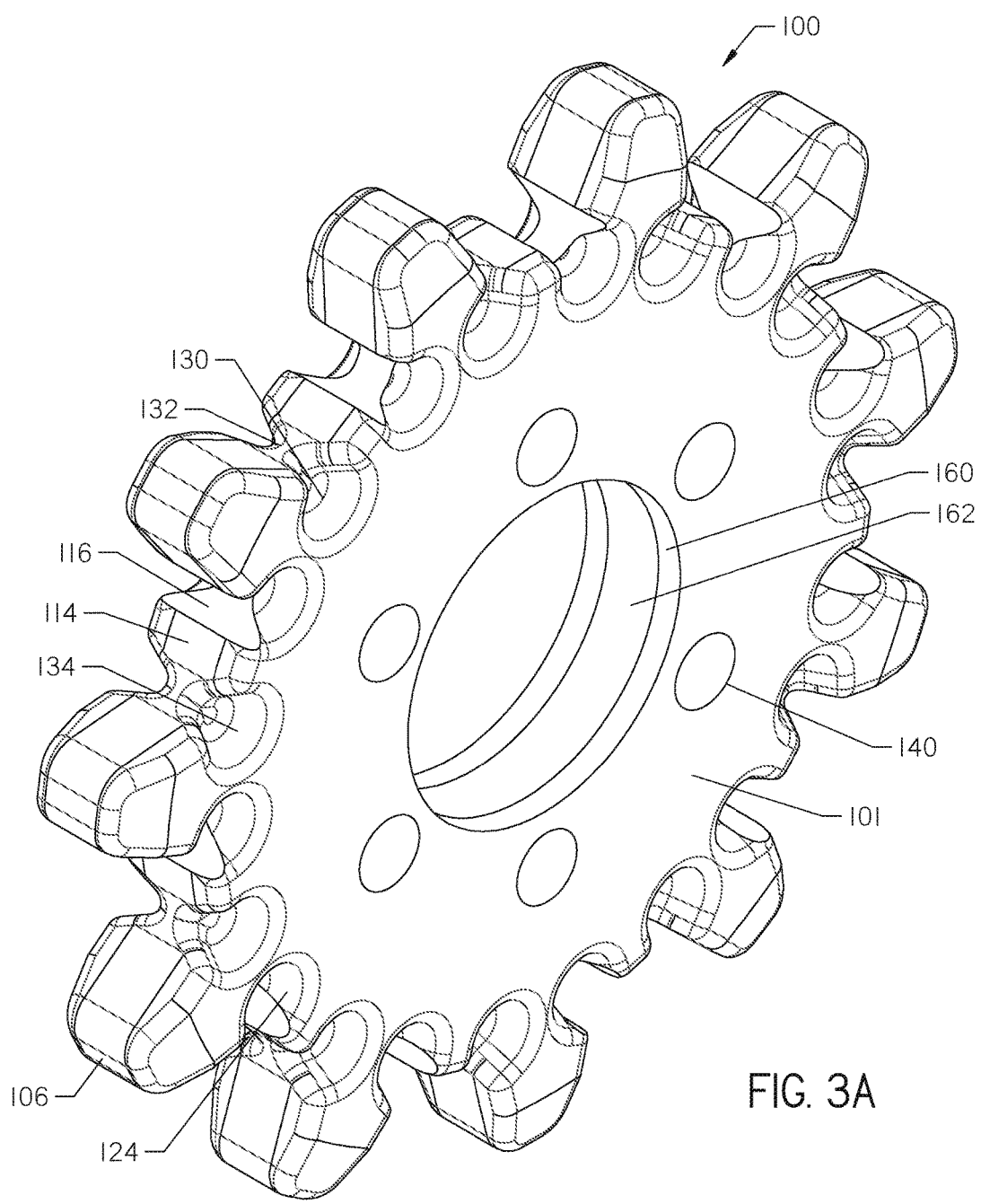
FIG. 3A is a perspective view of the sprocket of FIG. 1A.

FIG. 3 shows the sprocket 100 in perspective. The tapered portion 124 and tapered section 134 are shown more clearly. A transition from the body 101 of the sprocket 100 to the tapered portion 124 may mirror, relative to the intermediate tooth plane 112 (FIG. 1), a similar transition on the corresponding tapered section 134.

The sprocket 100 may be formed in one or more layers. As shown, outer layers 160 may be placed on either side of a core layer 162. The core layer 162 may be of a substantially uniform thickness while the outer layers 162 may provide the sprocket 100 with variances in its thickness, including the beveled tip 150 and tapered section 134. Alternatively, the sprocket 100 may be formed as one unitary piece.

Figure 4:
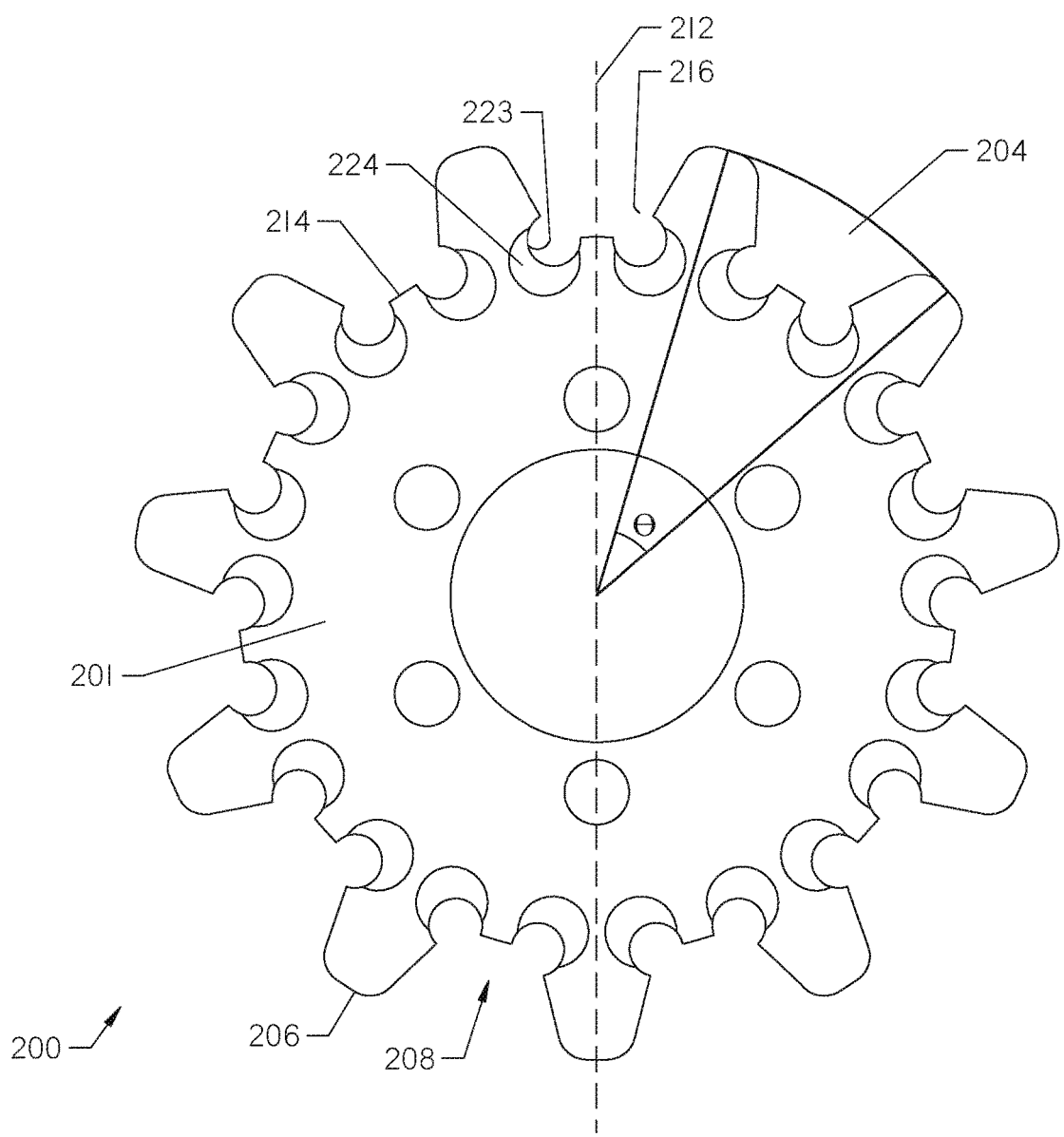
FIG. 4 is a side view of an alternative sprocket having dual mud reliefs.

With reference now to FIG. 4, an alternative sprocket 200 is shown. The alternative sprocket 200 comprises a body 201 and sectors 204 disposed about a periphery of the sprocket. The sectors 204 are defined by the radius extending from a center of the sprocket 200 and an adjacent pair of teeth 206, and the arc extending between those teeth.

The alternate saddle 208 comprises a seat 214 and two mud relief sections 216. The mud relief sections 216 each comprises a terminal wall 223 disposed in the sprocket 200. The terminal wall 223 has a thickness that is less than the thickness of the body 201 of the sprocket 200. A tapered portion 224 is disposed about the mud relief section 216. The tapered portion 224 has a thickness that is tapered between the thickness of the terminal wall 223 and the body 201.

The mud relief section 216 described herein is shaped as a cylindrical segment. As with mud relief section 116 (FIGS. 1-3), section 216 may be shaped differently.

A tooth plane 212 is disposed at a midpoint of the saddle 208, equidistant from each adjacent tooth 206. The sprocket 200 as shown in FIG. 4 is symmetrically disposed about the tooth plane 212. The tooth plane 212 passes through the seat 214. Each of the two mud relief sections 216 are fully disposed on a respective side of the tooth plane 212.

Figure 5:
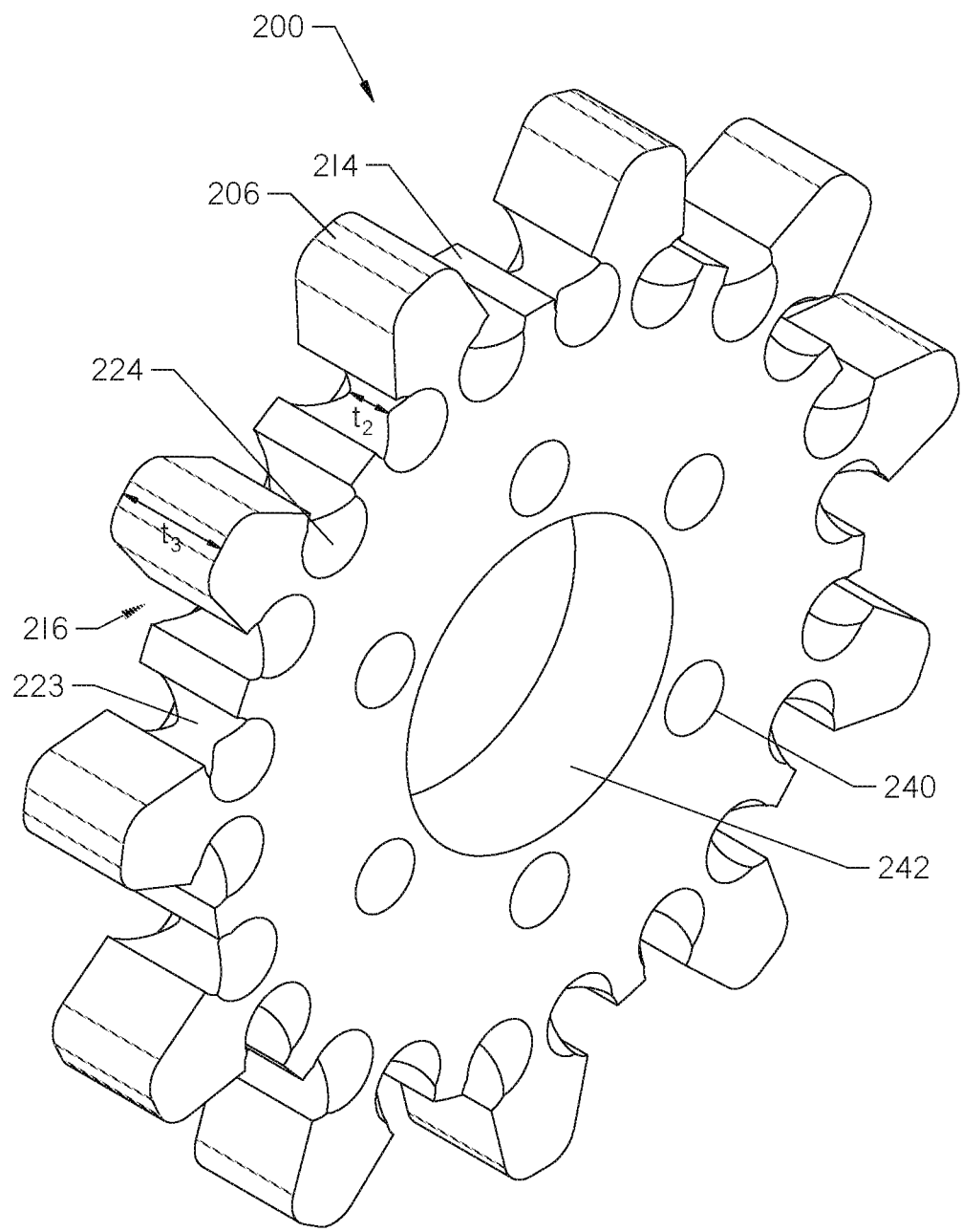
FIG. 5 is a perspective view of the alternative sprocket of FIG. 4.

With reference to FIG. 5, the alternative sprocket 200 is shown in perspective such that the thickness $t_3$ of the terminal wall 223 can be seen to be less than the thickness $t_2$ of is the body 201, seat 214, and teeth 206. The thickness of the teeth 206 in FIG. 5 is the same as the thickness of the body 201. The sprocket 200 in FIG. 5 defines connection points 240 and a central void 242. Thus, as with the sprocket 100 of FIG. 1, the sprocket 200 may be used as a "head sprocket" as will be described in more detail with reference to FIGS. 7-9.

Figure 6:
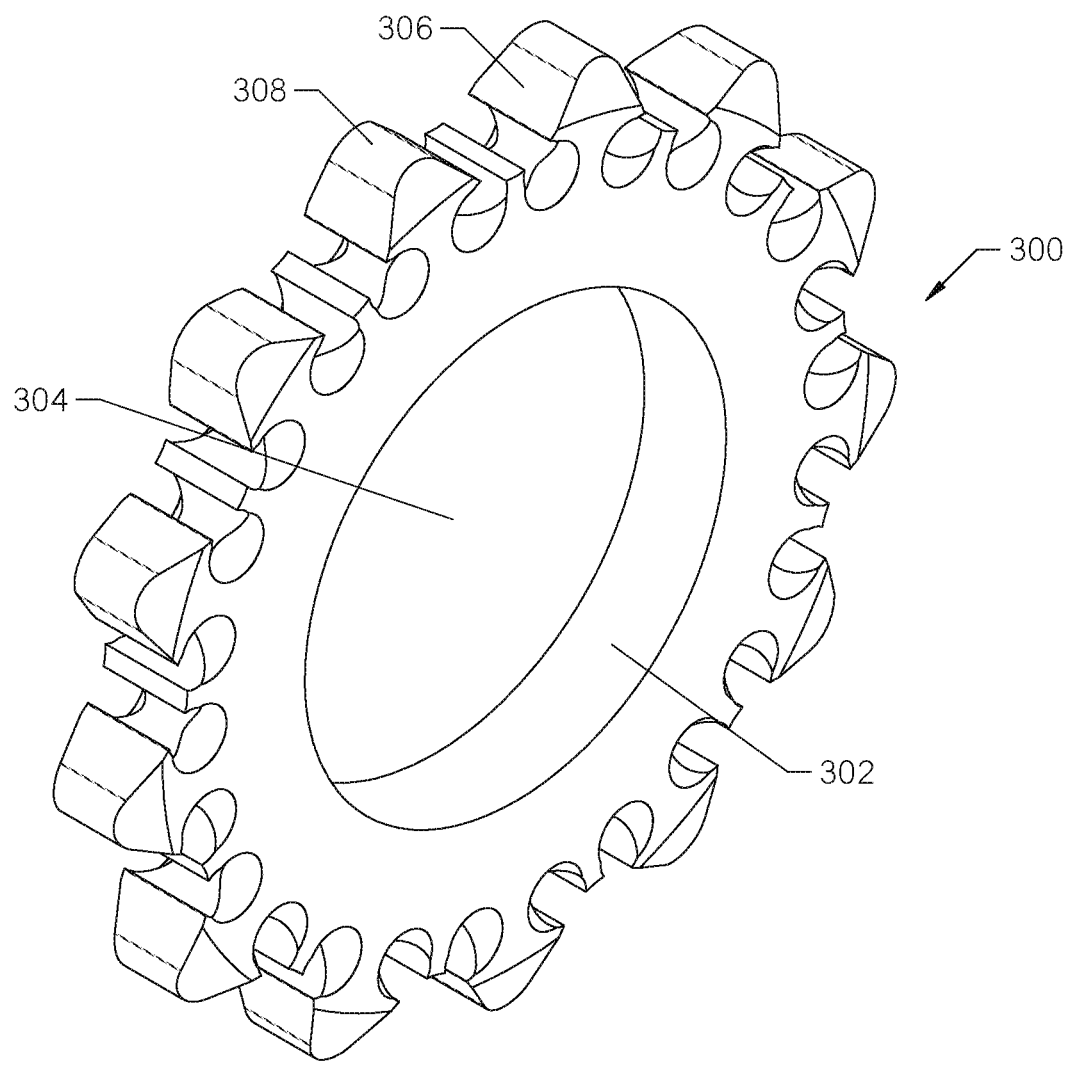
FIG. 6 is a side view of a sprocket not having connection points.

With reference to FIG. 6, sprocket 300 is shown without any connection points, but only a central void 302 formed within a body 301. Without connection points, sprocket 300 may be utilized as a "tail sprocket" and rotate about a center point 304 of the central void 302. The sprocket 300 comprises teeth 306 with a beveled tip 308. The thickness of the tip 308 is less than the thickness of the body 301. Further, the width of the tip 308 is less than the width of the tooth 306 near the body 301.

With reference again to FIG. 7, a trenching machine 10 for use with the sprocket 100 (FIG. 1) or alternative sprocket 200 (FIG. 4) is shown. The trenching machine 10 comprises a work machine 20 and a trenching attachment 11 comprising a pivotable trenching boom 12. A trenching chain 14 comprising a plurality of links 16 and teeth 18 is disposed about the trencher boom 12. The trenching boom 12 is attached to the work machine 20.

The attachment 11 comprises a frame 22 having a distal end 24 and a proximate end 26 relative the work machine 20. A cylinder 28 pivots the frame 22 relative to the work machine 20. A lift mechanism 30 may further manipulate the attachment 11 relative to the work machine 20. The lift mechanism 30 may comprise a cylinder 32 attached to the work machine 20 on one end and lift arms 33 on the other. As shown, the attachment 11 is attached to the lift arms 33. The work machine 20 powers the trenching chain 14 and trenching boom 12 and translates the attachment 11 relative to a surface of the ground.

In operation, the distal end 24 of the frame 22 is pivoted downward by the cylinder 28 and the trenching chain 14 rotates about the boom 12 such that the teeth 18 remove soil (or "spoils") and uncover a trench. The attachment 11 comprises a head sprocket 40 (FIG. 8) disposed within a head assembly 36 and a tail sprocket 100B disposed at opposite sides of the trencher boom 12 such that the chain 14 is disposed around the head sprocket and the tail sprocket.

Figure 8:
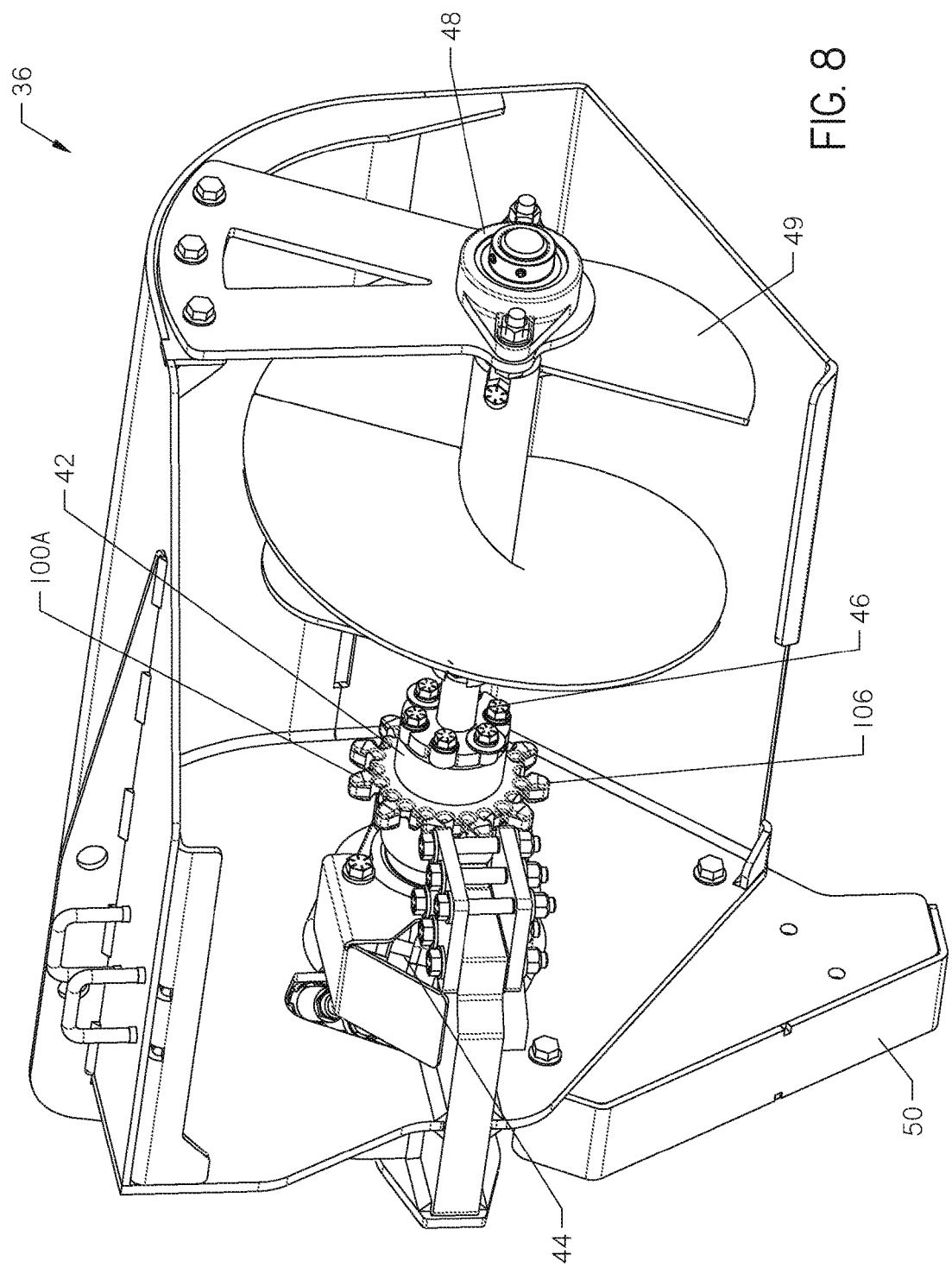
FIG. 8 is a bottom view of a head assembly for use with the trenching machine of FIG. 7.

With reference to FIG. 8, the head assembly 36 is shown with the trenching chain 14 and boom 12 removed for clarity. The head assembly 36 comprises the head sprocket 100A disposed on a head shaft 42. The head shaft 42 is turned by a motor 44. The head sprocket 100A comprises the teeth 106 to engage the chain (FIG. 7). As the head shaft 42 turns, the head sprocket 100A turns as welt, causing the trenching chain 14 (FIG. 1) to rotate about the trenching boom 12.

Figure 1A:
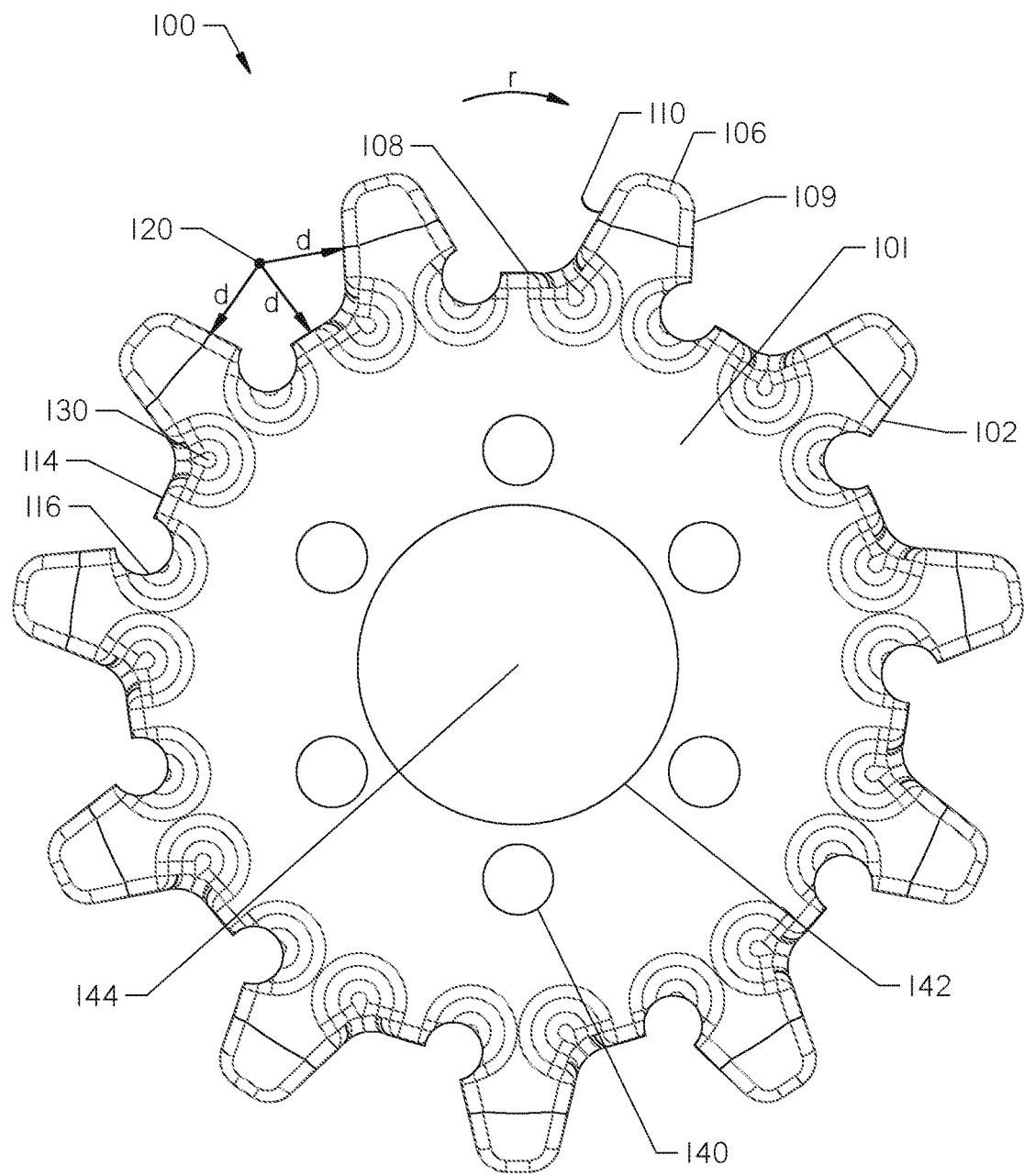
FIG. 1A is a side view of the sprocket of the present invention.
Figure 1B:
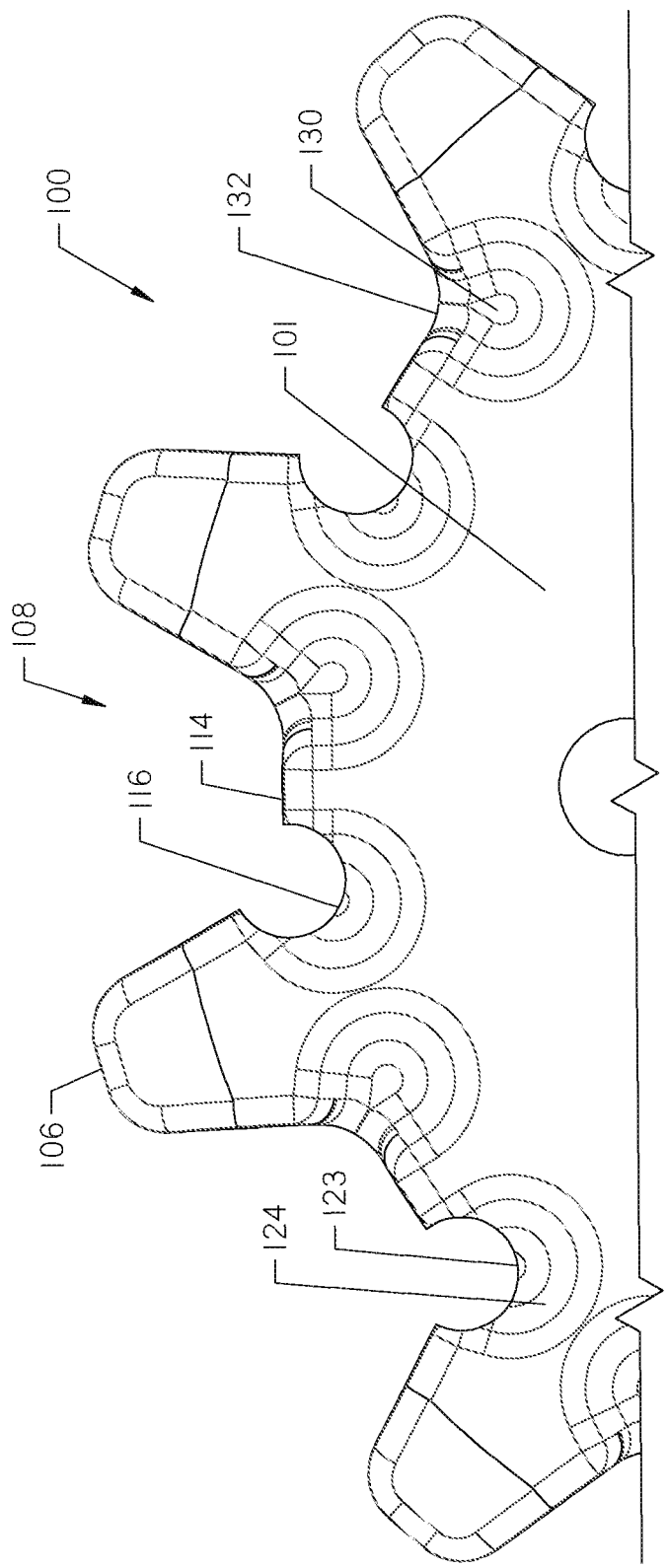
FIG. 1B is a cutaway side view of a saddle on the sprocket of FIG. 1A.
Figure 1C:
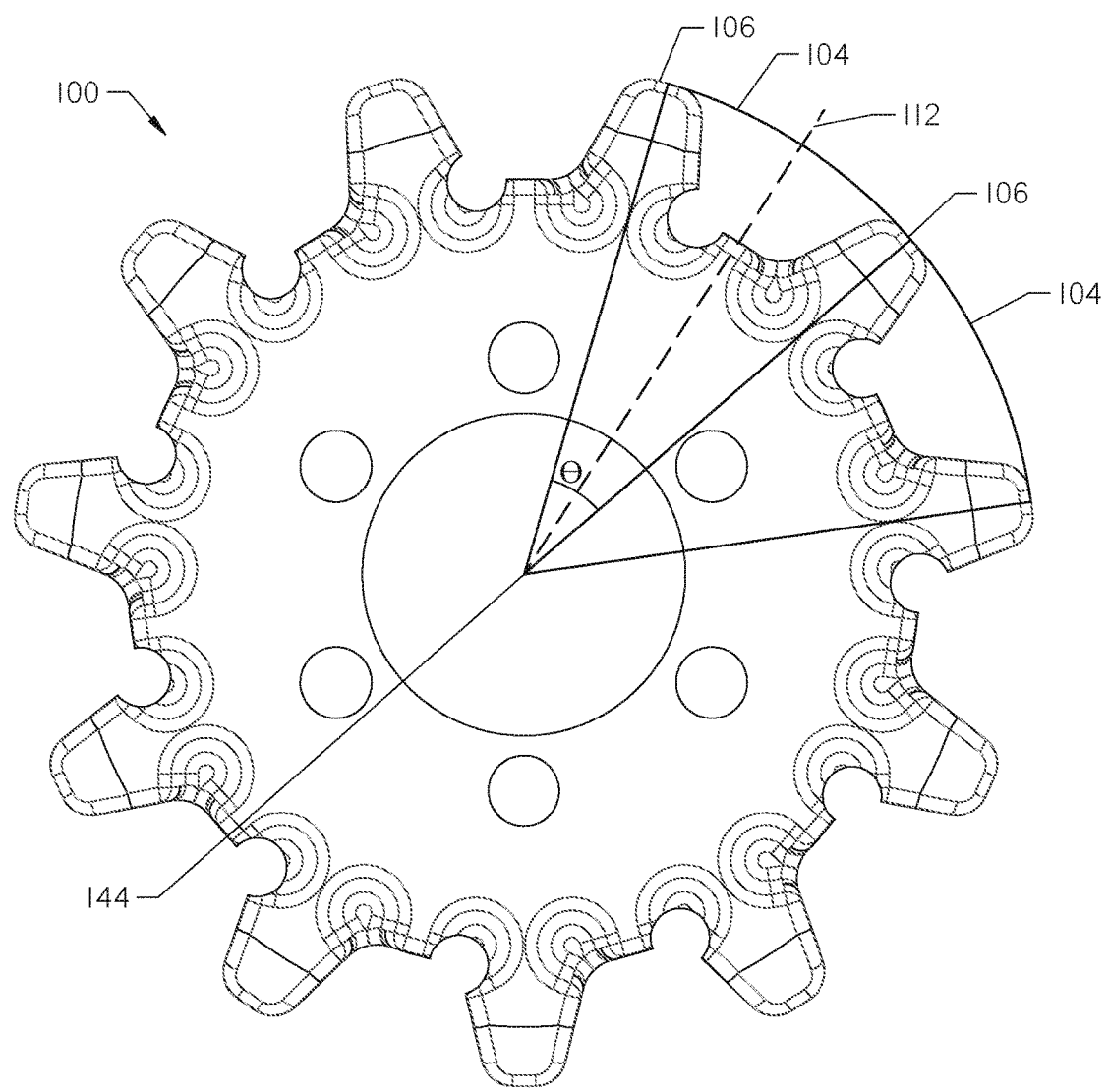
FIG. 1C is a side view of the sprocket of FIG. 1A with a reference sector and tooth plane shown.

The head shaft 42 may be attached to the head sprocket 100A by a plurality of bolts 46. As shown, there are six bolts 46. The bolts 46 wilt engage the head sprocket 100A at the connection points 140 (FIGS. 1-3) such that it rotates about a center axis disposed through the center point 144 (FIG. 1). Here, the center axis of rotation of the head sprocket is coaxial with the head shaft 42.

The head shaft 42 is connected to an auger attachment 48. As shown, rotation of the motor 44 actuates the auger attachment 48. As spoils are dislodged by the trenching chain 14 (FIG. 7), a rotating blade 49 of the auger attachment 48 moves such spoils away from the work machine 20 and uncovered trench. Alternatively, separate motors may power the head sprocket 100 and auger attachment 48.

A skid 50 is provided on the head assembly 36 to maintain a minimum distance between a surface of the ground and the head shaft 42, allowing ground clearance for the head sprocket 100 and auger attachment 48. Ground clearance allows efficient spoils removal and prevents interference with the rotation of the head shaft 42.

With reference to FIG. 9, the tail sprocket 100B is shown at the distal end 24 of the frame 22. The tail sprocket 100B is of the type 100 shown in FIG. 1, though any of the sprockets 100, 200, 300 described in FIGS. 1-6 may be utilized. The tail sprocket 100B is rotationally attached to the boom 12 at the center void 142 of the tail sprocket. As the chain 14 interacts with teeth 106, the tail sprocket 100B freely rotates relative to the boom 12 about a center axis. Bearings or similar connection mechanisms (not shown) connect the sprocket 34 to the boom 12. As shown, the connection points 142 of the tail sprocket 100B are not utilized.

The digging chain 14 comprises a plurality of rollers 70 disposed between the links 16. The tail sprocket 100B comprises teeth 106 which engage the chain 14. The chain 14 comprises rollers 70. As the chain 14 is rotated by the head sprocket 100A (FIG. 8), the rollers 70 interact with the tail sprocket 100B, causing it to rotate about the center void 142. The rollers 70 contact the tail sprocket 100B at the seat 114 and the teeth 106. Spoils that collect on the rollers 70 or sprocket 100B are funneled to the tapered section 124 of the mud relief portion 116 and the tapered section 134 of the partial mud relief 130.

Spoils may keep the digging chain 14 (FIG. 7) from fully contacting the sprockets, risking derailing the chains. Therefore, the mud relief sections 116, 216 described allow such material to be funneled away from contacts between the digging chain 14 (FIG. 7, FIG. 9) and the sprocket 100. The mud relief sections have a similar effect on the head sprocket 100A (FIG. 8).

Placement of the seat 114, 214 of the sprocket on the tooth plane 112, 212 provides a flat surface for seating the rollers 70. Thus, the sprocket 100, 200, 300 of the present invention resists erosion which would cause the rollers 70 to enter the void of the mud relief sections 116, 216. Such erosion would reduce or eliminate the effect of the mud relief. Preferably, the contact surfaces of the teeth 106 and seat 114 of FIG. 1 are substantially tangential to a surface of the roller 70 during contact.

It may be preferred for the head sprocket to have teeth, such as teeth 206 in FIGS. 4-5, without a bevel or with a reduced bevel. This allows the head sprocket 100 to have a more "complete" contact with the rollers 70 that it is driving, to prevent slippage between the head sprocket 100 and the digging chain 12. Conversely, it may be desirable for the tail sprocket to have teeth with a beveled tip 150, 308 such as those shown in FIG. 6. Beveled teeth on the tail sprocket 100B increases the reliability of connection between the tail sprocket and trenching chain 14 to reduce the risk of the chain misaligning with the sprocket.

One of skill in the art will appreciate that the sprocket design disclosed herein may be modified without departing from the spirit of the invention. The precise size, shape and placement of the mud relief portion may be adjusted based upon the particular trenching application. While hard metal materials are anticipated to be preferred with such sprockets, certain plastics and ceramics may be utilized if strength requirements are met. The relative size, shape, and number of sprocket teeth and mud relief portions are not meant to be limiting on the invention in any way.

What is claimed is:

1. A sprocket comprising:
    a body having a center;
    a plurality of teeth disposed about a periphery of the body; and
    a plurality of saddles disposed such that one and only one saddle is situated between each adjacent pair of teeth;
    wherein the sprocket defines a plurality of sectors, with each sector defined by a pair of rays extending from the center, with each ray passing through a midpoint of each of the teeth in an adjacent pair of teeth, and each sector is bisected by a tooth plane;
    wherein each of the plurality of saddles is asymmetrically formed relative to the tooth plane.

2. The sprocket of claim 1 wherein the saddle comprises a seat traversed by and perpendicular to the tooth plane.

3. The sprocket of claim 2 wherein the seat is hardened relative the remainder of the saddle.

4. The sprocket of claim 2 wherein the saddle further defines a mud relief portion recessed from the seat and disposed entirely on a single side of the tooth plane.

5. The sprocket of claim 4 wherein the mud relief portion is a void having the cross-sectional profile of an open curve.

6. The sprocket of claim 5 wherein the cross sectional profile of the mud relief portion is arcuate.

7. The sprocket of claim 1 wherein the each pair of two adjacent teeth and a midpoint of the saddle intermediate the pair of teeth are equidistant from a reference point, and wherein the saddle defines a mud relief portion disposed further away from the reference point than the midpoint of the saddle.

8. The sprocket of claim 7 wherein the saddle comprises a seat traversed by and perpendicular to the tooth plane.

9. The sprocket of claim 7 wherein the saddle defines a mud relief portion bounded by a curve disposed between the midpoint of the saddle and one of the pair of teeth, wherein a thickness of the sprocket at the curve is less than the maximum thickness of the sprocket body.

10. The sprocket of claim 9 wherein the curve is closer to the reference point than the mud relief portion.

11. The sprocket of claim 1 wherein each of the plurality of teeth comprise a beveled tip.

12. A trencher boom comprising;
a frame pivotable about a first axis;
the sprocket of claim 1 disposed at a first end and a second end of the frame; and
a digging chain disposed about the frame and each of the sprockets.

13. A sprocket comprising:
a body;
a plurality of radially-disposed teeth, wherein each adjacent pair of the plurality of teeth defines a tooth plane disposed at a midpoint between the adjacent pair of teeth;
a plurality of seats such that one and only one seat is located on the tooth plane between each adjacent pair of the plurality of teeth; and
a plurality of mud relief portions disposed between each of the plurality of seats and an adjacent tooth, wherein each mud relief portion is disposed entirely on a single side of its associated tooth plane.

14. The sprocket of claim 13 wherein the mud relief portions are recessed within the sprocket relative to the seat and the teeth.

15. The sprocket of claim 13 wherein one mud relief portion is disposed on each side of each of the plurality of seats.

16. The sprocket of claim 13 wherein the plurality of teeth each define a leading edge and a trailing edge, wherein each mud relief portion is disposed between the seat and the leading edge of an adjacent tooth.

17. The sprocket of claim 16 wherein the mud relief portions are each a void having the cross-sectional profile of an open curve.

18. The sprocket of claim 17 wherein the cross-sectional profile of the mud relief portion is arcuate.

19. A sprocket comprising:
a body having a center;
a plurality of teeth disposed around a periphery of the body, each tooth situated on a radius extending from the body center, each adjacent pair of radii defining a sprocket sector; and
a plurality of saddles formed about the periphery of the body, with one and only one saddle situated between each adjacent pair of teeth, each saddle contained within a single sprocket sector and shaped asymmetrically with respect to a saddle plane that bisects the sprocket sector into equally sized parts.

20. The sprocket of claim 19 in which each sprocket sector has a central angle, and the central angles of the sprocket sectors are identical.

21. A sprocket comprising:
a body;
a plurality of teeth disposed around the periphery of the body, in which each adjacent pair of the plurality of teeth defines a tooth plane disposed at a midpoint between the teeth;
a plurality of first recesses formed in the body between each adjacent pair of teeth such that at least one first recess is situated on a first side of each tooth plane; and
a plurality of second recesses formed in the body between each adjacent pair of teeth such that at least one second recess is situated on a second side of each tooth plane;
in which the body is asymmetric about the tooth plane in the region between each adjacent pair of teeth.

22. The sprocket of claim 21 further comprising a plurality of saddles, each saddle having a seat, in which each seat is disposed between the first recess and the second recess.

23. The sprocket of claim 22 in which each seat is traversed by the tooth plane.

24. The sprocket of claim 21 in which the first and the second recesses have the cross-sectional profile of an open curve.

25. The sprocket of claim 24 in which at least one of the first recesses is larger than at least one of the second recesses.

* * * * *

UNITED STATES PATENT AND TRADEMARK OFFICE
CERTIFICATE OF CORRECTION

PATENT NO. : 10,030,360 B2  
APPLICATION NO. : 15/262509  
DATED : July 24, 2018  
INVENTOR(S) : Sewell et al.

Page 1 of 1

It is certified that error appears in the above-identified patent and that said Letters Patent is hereby corrected as shown below:

In the Specification

Column 1, Line 7, please delete "tiled" and substitute therefore "filed".

Column 2, Line 17, after the word "impaired", please delete "," and substitute therefore ".".

Column 2, Line 26, please delete "no" and substitute therefore "110".

Column 2, Line 46, please delete "scat" and substitute therefore "seat".

Column 2, Line 57, please delete "watt" and substitute therefore "wall".

Column 3, Line 47, please delete "11.4" and substitute therefore "114".

Column 4, Line 30, please delete "is".

Column 5, Line 13, please delete "welt" and substitute therefore "well".

Column 5, Line 18, please delete "wilt" and substitute therefore "will".

Signed and Sealed this  
Fourth Day of September, 2018

Andrei Iancu  
*Director of the United States Patent and Trademark Office*